(12) United States Patent
Väisänen

(10) Patent No.: US 6,382,279 B1
(45) Date of Patent: May 7, 2002

(54) METHOD FOR MANUFACTURING A BOX, PROVIDED WITH A LID, FROM A THIN TREE TRUNK OR A BRANCH

(76) Inventor: Juhani Väisänen, P.O. Box 21, Fin-00511, Helsinki (FI)

( * ) Notice: Subject to any disclaimer, the term of this patent is extended or adjusted under 35 U.S.C. 154(b) by 0 days.

(21) Appl. No.: 09/486,050
(22) PCT Filed: Aug. 19, 1998
(86) PCT No.: PCT/FI98/00637
§ 371 Date: Apr. 20, 2000
§ 102(e) Date: Apr. 20, 2000
(87) PCT Pub. No.: WO99/10144
PCT Pub. Date: Mar. 4, 1999

(30) Foreign Application Priority Data

Aug. 22, 1997 (FI) .................................................. 973464

(51) Int. Cl.[7] ................................................. B27M 1/08
(52) U.S. Cl. ........................... 144/353; 83/169; 83/676; 83/835; 83/854; 144/3.1; 144/218; 144/240; 144/345; 144/364; 144/367; 144/379; 144/329; 144/355
(58) Field of Search .......................... 83/169, 171, 676, 83/835, 854, 847, 852; 144/218, 240, 373, 375, 353, 355, 364, 365, 329, 3.1, 345, 367, 379; 217/3 BC, 3 CB

(56) References Cited

U.S. PATENT DOCUMENTS

| | | | | |
|---|---|---|---|---|
| 1,682,606 A | * | 8/1928 | Dvilnsky ...................... | 83/676 |
| 2,531,841 A | * | 11/1950 | Cashin ......................... | 83/676 |
| 2,903,782 A | * | 9/1959 | Cowley ........................ | 83/676 |
| 3,152,501 A | * | 10/1964 | Nassar ......................... | 83/676 |
| 4,436,006 A | * | 3/1984 | Nakamura et al. ............ | 83/676 |
| 5,746,263 A | * | 5/1998 | Koverola ..................... | 144/365 |
| 5,890,409 A | * | 4/1999 | Carlton et al. ............... | 144/240 |
| 6,186,200 B1 | * | 2/2001 | Figovsky et al. ............ | 144/364 |

FOREIGN PATENT DOCUMENTS

| | | | |
|---|---|---|---|
| DE | 22 43 705 | 3/1974 | |
| DE | 24 29 815 | 1/1976 | |
| DE | 29 20 610 | 11/1980 | |
| GB | 12469 | * 2/1849 | ................. 144/240 |
| GB | 2305390 | 9/1996 | |
| SU | 4904065 | 1/1991 | |

* cited by examiner

Primary Examiner—W. Donald Bray
(74) Attorney, Agent, or Firm—Connolly Bove Lodge & Hutz, LLP

(57) ABSTRACT

A cylindrical hollow blank 1 is separated longitudinally from inside an elongate block of wood by axial boring, the blank is dried and its outer and inner surfaces finished, eg by milling, turning and sanding, and a bottom piece (2, FIG. 2) and, if required, a lid (3, FIG. 2) are then added to form a container. A plurality of cylindrical blanks of different diameters may be produced from a single block. Two concentric core bits of different diameters may be used to bore a blank.

48 Claims, 2 Drawing Sheets

METHOD FOR MANUFACTURING A BOX, PROVIDED WITH A LID, FROM A THIN TREE TRUNK OR A BRANCH

The present invention concerns a method for manufacturing a lidded case from a thin tree trunk or branch, in which method a piece corresponding to the height of the lidded case is sawn from the tree trunk or branch.

When manufacturing a lidded case from a thin tree trunk or branch, which is gnarled and twisted and the outer surface of which is provided with many longitudinal grooves, the lid part cannot be cut off by sawing, because the saw blade destroys a too large and often an irregular part of the piece of wood, so that the lid part that has been cut off no longer fits the case part, due to the unevennesses in the outer surface of the tree truck, or else it does not lie straight on the case part, thus spoiling the external appearance of the case. In addition, the sawn surfaces are so irregular that they have to be sanded down, whereby more material is removed from the surfaces, which further distorts the fit of both parts. Sawing thin, gnarled and twisted pieces of wood is also very difficult and dangerous, especially to fingers and face of a person performing the sawing, due to the small size of the pieces being handled and to chips easily breaking away from said pieces and being thrown around.

The present invention is intended to resolve this problem, by means of a method characterized in that the lid part is cut off from said piece of wood by means of a thin, disc-like, rotating cutting blade having a completely smooth circumferential surface but the outer edges of its sides being provided with mainly radial grooves, extending to the circumferential surface, while water is led to a cutting point during the entire cutting stage.

The method according to the present invention gives an extremely thin and smooth cut, requiring no further treatment. Thanks to the thin cut, the lid part and the case part fit together well, despite the gnarled and grooved external appearance of the piece of wood used as raw material. The method is particularly suitable when juniper, for example, is used as the raw material for the case. In addition, the cutting blade 5 used in the method is completely safe to fingers and will not damage them, even if they would come into direct contact with the cutting blade 5.

The other characteristics of the invention are described in the dependent claims 2–10.

Figure 1:
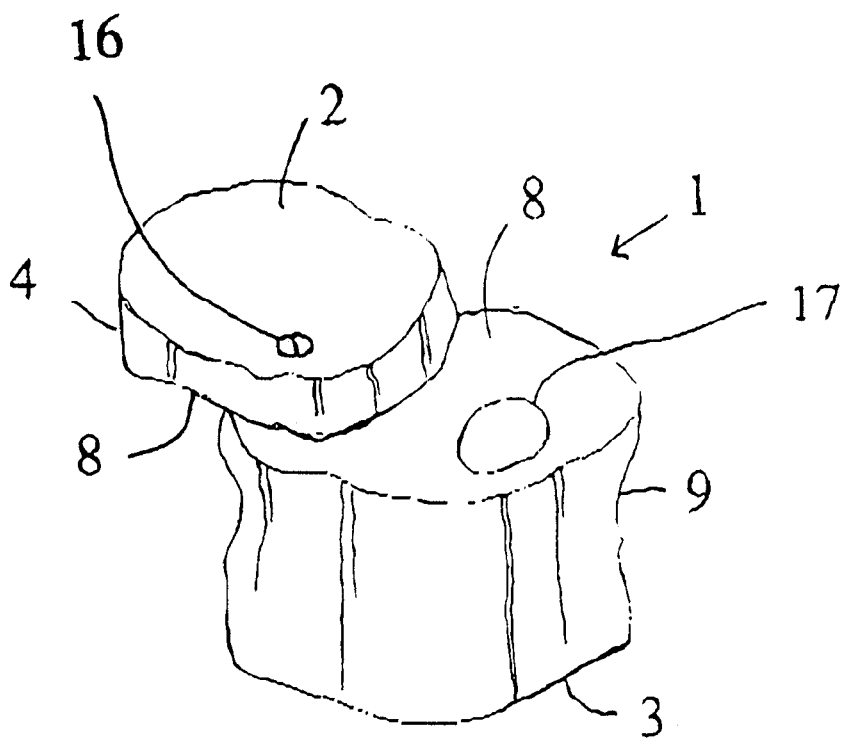
Figure 2:
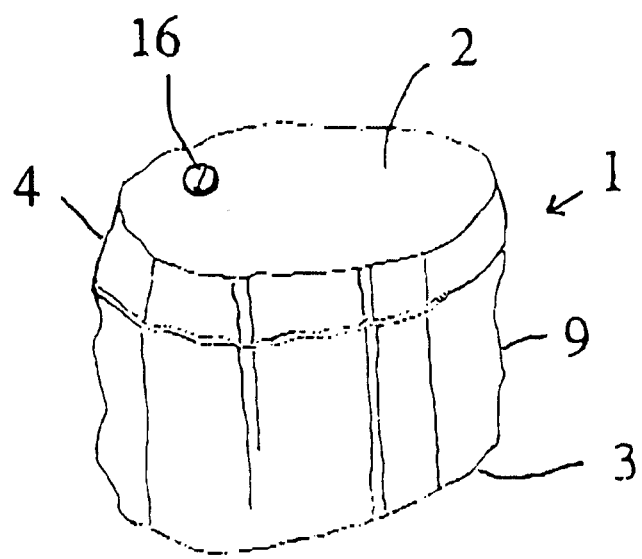
Figure 3:
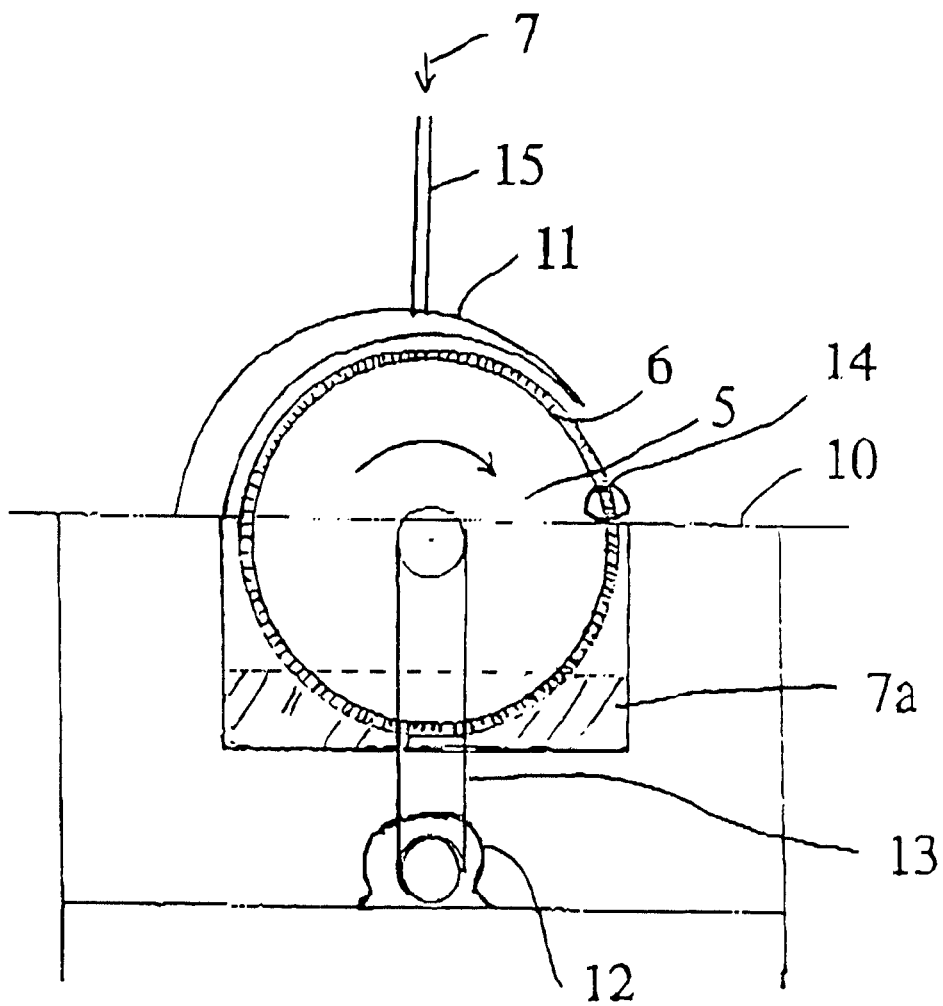

The invention is next described in greater detail, with reference to the accompanying drawing, in which FIG. 1 shows an example of a case with a lid manufactured by the method according to the invention, with the lid in an open position, FIG. 2 shows the case in FIG. 1 in a closed position, FIG. 3 shows diagrammatically an example of an equipment used to perform the method according to the invention.

When a lidded case 1 is manufactured from a thin tree truck or branch, particularly from a species of tree having a trunk and branches with an extremely gnarled and twisted outer surface, a sufficient amount of pieces having a height corresponding to the total height of a lidded case is first sawn from the tree trunk or branch using a conventional circular saw or a similar device. The sawn surfaces 2, 3 of the pieces are sanded down either at once, or after the lid part 4 has been cut off. The bark has been removed from the tree trunck or branch in advance, so the outer surface of the piece of wood is a grooved and gnarled exposed wood surface.

The lid part 4 is cut off from the sawn piece, using a thin, disc-like, rotating cutting blade 5 having a completely smooth circumferential surface, but the outer edges of its sides being provided with mainly radial grooves 6, extending to the circumferential surface. During the entire cutting stage, water 7 is led to the cutting point, so that the cutting blade 5 remains at a suitable temperature and its cutting effect remains good. When the lid part 4 is cut off the sawn piece in the manner according to the invention, the cut is very narrow and even, while the cut surfaces 8 are left so smooth that no further treatment is necessary. Thanks to this, the lid part 4 and the case part 9 itself match each other so well, despite their gnarled, grooved outer surface, that the longitudinal grooves and gnarls continue uniformly and in the same direction from the case part 9 to the lid part 4, as shown in FIG. 2. Thus, when the case is in the closed position, the outer surface of the case part 9 evenly matches the outer surface of the lid part 4.

The device to be used in the method according to the invention is shown diagrammatically in FIG. 3. In the device, there is a cutting table 10, with an elongated slot for a cutting blade 5. The section of the cutting blade 5, extending above the cutting table 10 is partly covered by a guard 11. As a power source for the cutting blade 5 an electric motor 12 with an output of advantageously about 350–450 W is used, which is arranged to drive the cutting blade 5 at a speed of at least 1000 revolutions per minute, preferably even 2700 rpm. A circumferential velocity of more than 13 m/s, advantageously more than 18 m/s, is maintained for the cutting blade 5. For smallsized pieces of wood cutting blades 5 with a diameter of 100–200 mm are suitable used and for largersized pieces of wood cutting blades with diameters of 200–400 mm are used. A suitable thickness for the cutting blade is about 0.5–1.0 mm. According to the embobiment shown, the transmission is either a chain or a belt 13, although the cutting blade, of course, can be mounted directly on the drive shaft of the motor 12, too. Water 7 is advantageously led to the cutting point 14 through a water-feeding conduit 15 ending at the guard 11 of the cutting blade 5 and/or by keeping a lower section of the cutting blade 5 immersed in a water bath 7a. Adjustment of the water flow in the water feeding conduit 15 is advantageously carried out by using a control valve (not shown).

In order to prevent excessive wetting of the piece of wood, the piece of wood is preferably kept enclosed within a plastic film during the cutting operation. This will ensure that the water 7 comes in contact with the wood only at the cutting point 14 itself, so the lid part 4 and the case part 9 will not become excessively wet, thus reducing or eliminating the risk of splitting due to wetting.

The lid part 4 is advantageously cut off the case part 9 so that the cutting surface 8 is parallel to the base 3 of the case part 9, facilitating the attachment of the lid part 4 to the case part 9 by means of a screw 16 or a corresponding member, whereby the case 1 can be opened by pushing the lid part 4 sideware, as shown in FIG. 1.

At least one cavity 17, corresponding to an object or objects to be stored, is cut into the upper end of the case part 9. Case 1 can be used, for example, as a pillbox or as a jewellery case. In one preferred embodiment, a cavity 17 is cut into the case part for each accessory in a set of jewellery. If, for example, the set includes earrings and a pendant necklace, the upper surface 8 of the case part can be provided with a central cavity for the pendant and its chain and on both sides of this cavity a cavity for each earring.

After sanding down the sawn surfaces 2 and 3 of the case, at least the upper surface 2 of the lid part 4 can be decorated, with either pokerwork or carving.

What is claimed is:
1. A method for manufacturing a lidded case from a thin tree trunk or branch, comprising the steps of:

sawing a piece of said tree trunk or branch to a length corresponding to height of such a lidded case, cutting off a lid part from said piece by means of a rotating thin and disc like cutting blade, having a completely smooth circumferential surface but outer edges of its side surfaces being provided with mainly radial grooves extending to said circumferential surface, and leading water to a cutting point during the entire cutting stage.

2. A method according to claim 1, characterized in that the cutting blade is rotated at a circumferential velocity exceeding 13 m/s.

3. A method according to claim 2, characterized in that water is led to the cutting point by dripping water on top of the cutting blade.

4. A method according to claim 3, characterized in that the piece of wood is kept wrapped in a plastic film while the lid part is cut off.

5. A method according to claim 4, characterized in that the lid part is cut off so that the base and the upper surface of the case part are parallel to one another.

6. A method according to claim 5, characterized in that at least one cavity, corresponding to the shape of an object or objects to be stored, is carved into the upper end of the case part.

7. A method according to claim 6, characterized in that cavities for each part of a set of jewelry are carved into the upper surface of the case part.

8. A method according to claim 7, characterized in that the upper surface of the lid part and the surface of the base of the case part are sanded down and decorated in a suitable manner.

9. A method according to claim 8, characterized in that the lid part is attached to the case part by means of a vertical screw or similar means.

10. A method according to claim 1, characterized in that the case is manufactured from juniper.

11. A method according to claim 2, wherein the case is manufactured from juniper.

12. A method according to claim 3, wherein the case is manufactured from juniper.

13. A method according to claim 4, wherein the case is manufactured from juniper.

14. A method according to claim 5, wherein the case is manufactured from juniper.

15. A method according to claim 6, wherein the case is manufactured from juniper.

16. A method according to claim 7, wherein the case is manufactured from juniper.

17. A method according to claim 8, wherein the case is manufactured from juniper.

18. A method according to claim 9, wherein the case is manufactured from juniper.

19. A method according to claim 2, characterized in that the cutting blade is rotated at a circumferential velocity exceeding 18 m/s.

20. A method according to claim 2, characterized in that water is led to the cutting point by keeping a lower section of the cutting blade immersed in a water bath.

21. A method according to claim 2, characterized in that water is led to the cutting point by dripping water on top of the cutting blade and by keeping a lower section of the cutting blade immersed in a water bath.

22. A method according to claim 20, characterized in that the piece of wood is kept wrapped in a plastic film while the lid part is cut off.

23. A method according to claim 21, characterized in that the piece of wood is kept wrapped in a plastic film while the lid part is cut off.

24. A method according to claim 22, characterized in that the lid part is cut off so that the base and the upper surface of the case part are parallel to one another.

25. A method according to claim 23, characterized in that the lid part is cut off so that the base and the upper surface of the case part are parallel to one another.

26. A method according to claim 24, characterized in that at least one cavity, corresponding to the shape of an object or objects to be stored, is carved into the upper end of the case part.

27. A method according to claim 25, characterized in that at least one cavity, corresponding to the shape of an object or objects to be stored, is carved into the upper end of the case part.

28. A method according to claim 26, characterized in that cavities for each part of a set of jewelry are carved into the upper surface of the case part.

29. A method according to claim 27, characterized in that cavities for each part of a set of jewelry are carved into the upper surface of the case part.

30. A method according to claim 28, characterized in that the upper surface of the lid part and the surface of the base of the case part are sanded down and decorated in a suitable manner.

31. A method according to claim 29, characterized in that the upper surface of the lid part and the surface of the base of the case part are sanded down and decorated in a suitable manner.

32. A method according to claim 30, characterized in that the lid part is attached to the case part by means of a vertical screw or similar means.

33. A method according to claim 31, characterized in that the lid part is attached to the case part by means of a vertical screw or similar means.

34. A method according to claim 19 characterized in that the case is manufactured from juniper.

35. A method according to claim 20 characterized in that the case is manufactured from juniper.

36. A method according to claim 21 characterized in that the case is manufactured from juniper.

37. A method according to claim 22 characterized in that the case is manufactured from juniper.

38. A method according to claim 23 characterized in that the case is manufactured from juniper.

39. A method according to claim 24 characterized in that the case is manufactured from juniper.

40. A method according to claim 25 characterized in that the case is manufactured from juniper.

41. A method according to claim 26 characterized in that the case is manufactured from juniper.

42. A method according to claim 27 characterized in that the case is manufactured from juniper.

43. A method according to claim 28 characterized in that the case is manufactured from juniper.

44. A method according to claim 29 characterized in that the case is manufactured from juniper.

45. A method according to claim 30 characterized in that the case is manufactured from juniper.

46. A method according to claim 31 characterized in that the case is manufactured from juniper.

47. A method according to claim 32 characterized in that the case is manufactured from juniper.

48. A method according to claim 33 characterized in that the case is manufactured from juniper.

* * * * *